US005157610A

United States Patent [19]

Asano et al.

[11] Patent Number: 5,157,610

[45] Date of Patent: Oct. 20, 1992

[54] SYSTEM AND METHOD OF LOAD SHARING CONTROL FOR AUTOMOBILE

[75] Inventors: Seiji Asano, Matsuta; Kozo Katogi, Hitachi; Toshio Furuhashi, Mito; Shizuhisa Watanabe, Katsuta; Kiyoshi Miura, Ibaraki, all of Japan

[73] Assignee: Hitachi, Ltd., Tokyo, Japan

[21] Appl. No.: 480,284

[22] Filed: Feb. 15, 1990

[30] Foreign Application Priority Data

Feb. 15, 1989 [JP] Japan .................................. 1-33595

[51] Int. Cl.[5] .............................................. G06F 13/00

[52] U.S. Cl. .......................... 364/424.03; 364/424.01; 73/117.3

[58] Field of Search ...................... 364/431.01, 424.03, 364/551.01, 424.04, 138; 340/870.16, 870.03; 73/117.2, 117.3

[56] References Cited

U.S. PATENT DOCUMENTS

| | | | |
|---|---|---|---|
| 4,258,421 | 3/1981 | Juhasz et al. | 364/424.03 |
| 4,757,463 | 7/1988 | Ballou et al. | 364/551 |
| 4,796,206 | 1/1989 | Boscove et al. | 364/551.01 |
| 4,853,859 | 8/1989 | Morita et al. | 364/424.04 |
| 4,939,652 | 7/1990 | Steiner | 364/424.04 |

FOREIGN PATENT DOCUMENTS

| | | |
|---|---|---|
| 0002232 | 6/1979 | European Pat. Off. . |
| 0292811 | 11/1988 | European Pat. Off. . |
| 2535491 | 5/1984 | France . |
| 2559929 | 4/1985 | France . |
| 2100895 | 1/1983 | United Kingdom . |
| 2125578 | 3/1984 | United Kingdom . |
| 2179225 | 8/1985 | United Kingdom . |

OTHER PUBLICATIONS

IEEE Spectrum, vol. 23, No. 6, Jun. 1986, New York US pp. 53–59.

*Primary Examiner*—Thomas G. Black

[57] ABSTRACT

A system and method for load sharing processing operations between a vehicle mounted station (105) and a stationary base station (25) having a large capacity host computer is described. The vehicle mounted station has detectors for determining operating conditions of a vehicle and controllers (3, 4, 501) for varying the operating conditions. The controllers are connected to a transmitter-receiver (5) which is arranged to communicate over a path (10) with a transmitter-receiver (11) of the base station. The base station has a host computer (18) having a large memory capacity. At predetermined intervals, for example, distance of travel or at engine stop, the vehicle transmitter (5) transmits operating conditions to the base receiver (11) for data processing and the base transmitter (11) then transmits processed data back to the vehicle receiver (5), whereupon the controllers (3, 4, 501) modify the vehicle operating conditions. The vehicle operating conditions may be an indication of life expectancy of fuel injectors or sensors, updating data processing maps. The presence of abnormal operating conditions may be detected by the vehicle mounted station, evaluated by the base station and an emergency warning indication provided back to the vehicle mounted station, or if the abnormal condition is not of an emergency nature then counter measures are transmitted from the base station to the vehicle mounted station.

20 Claims, 11 Drawing Sheets

SYSTEM AND METHOD OF LOAD SHARING CONTROL FOR AUTOMOBILE

BACKGROUND OF INVENTION

1) Field of Invention

This invention relates to a system and method for load sharing processing operations between a vehicle mounted station and a stationary base station and in particular for controlling various items of equipment mounted on an automobile using a large-capacity host computer installed at a stationary base station, e.g. on the ground.

2) Description of Related Art

The number of electrically controlled items used in an automobile, particularly an internal combustion engine, are increasing and control systems therefor are becoming ever more complicated. Several different systems have been attempted to collectively control the various items by time sharing interruptable arithmetic processing using a processor mounted on the automobile.

Such examples include Japanese Patent Publication No. 63-15469 (1988), "Electronic Engine Controller" and Japanese Patent Publication No. 62-18921 (1987), "Computer for Vehicle Control", and controls using a computer are now common.

A central control method using a LSI microprocessor responds to many requirements, such as responding to hazardous components located in the exhaust gas of the internal combustion engine and for reducing fuel consumption. In addition, microprocessors have been utilized in areas extending to attitude control, i.e. levelling control, steering performance and driving stability with regard to a vehicle body suspension control.

Regarding transmission of programs between a base station and the vehicle, for example, there is Japanese Patent Application Laid-Open No. 62-38624 (1987), "Radiocommunication Unit". However, this publication relates to revision of an operational control program for a vehicle mounted processor, and does not teach load sharing under predetermined driving conditions. In addition, regarding mutual communications, there is Japanese Patent Application Laid-Open No. 62-245341 (1987), "Engine Controller", but this describes only installation of a means to load failure diagnosis is programs and does not mention any relationship with the driving conditions of the vehicle.

A full dependence upon a vehicle-mounted processor to process all that is included in the above mentioned conventional technologies and control systems to be newly installed will not only make the system complex but also necessitate a large-capacity processor. Computer control has been used to exploit such advantages as high processing speed and accuracy, easy modification of control characteristics and low cost. However, there are numerous control items, including fuel supply control and ignition control, for which real-time processing is required and implementing all of these together is difficult.

That is, processing all control parameters including the initial setting correction of set values caused by ageing (wear) changes of various characteristics, for example, an engine, transmission, steering, suspension, within a control system having only a vehicle-mounted computer makes the processing program increasingly large.

However, the conventional technologies are neither concerned with this difficulty nor even indicate that there is such a problem.

SUMMARY OF THE INVENTION

An object of this invention is to provide a new computer control method for vehicles which at least partially mitigates the above mentioned problems.

According to one aspect of this invention there is provided a method of load sharing processing operations between a vehicle mounted station and a stationary base station including the steps of said vehicle mounted station detecting operating conditions of the vehicle, transmitting data representative of the detected operating conditions to the base station, said base station receiving data from the vehicle mounted station, processing said data in accordance with data stored by said base station, said base station transmitting processed data to a receiver at said vehicle mounted station and control means at said vehicle mounted station connected to the vehicle mounted receiver and being arranged to perform at least one of revising or displaying the vehicle operating conditions in dependence upon the processed data.

Advantageously the vehicle mounted station detected operating conditions are performed by a detecting means adapted to detect at least one of water temperature, air flow ratio air fuel quantity, battery voltage, throttle valve opening angle, engine speed, transmission gear position and suspension setting. In a feature of this invention the vehicle mounted station includes a control means adapted to control at least one of a fuel injector, a transmission gear change means, and a suspension setting actuator.

Conveniently the data transmitted from the vehicle mounted station to the base station is performed at times of occurrence of predetermined conditions including at least one of the vehicle covering a predetermined distance, detection of the engine ceasing rotation and low fuel tank condition, and advantageously data transmitted between the vehicle mounted station and the base station includes header bits, vehicle identification bits, data control bits, data array bits, check symbol bits and end of transmission bits.

Preferably the vehicle mounted station transmits a request to transmit to the base station, said base station transmits a permission to transmit for the vehicle mounted station, said vehicle transmits data including header bits, vehicle identification bits, data control bits, data array bits and check symbol bits, said base station transmits a receipt acknowledgement and said stationary base station transmits end of transmission bits. In one preferred embodiment the vehicle mounted station contains at least one map indicative of vehicle operating conditions including an indication of ageing in at least one of vehicle injectors and sensors, said map being transmitted by said vehicle mounted station to said base station, said base station comparing transmitted map values with previously transmitted map values and estimating the amount of deterioration in said injectors and sensors, said base station being arranged to estimate the life expectancy of said injectors and sensors and to transmit data indicative thereof to said vehicle mounted station whereby said vehicle mounted station stores said updated information and indicates the life expectancy by visual or aural means. In such an embodiment corrected map values are transmitted from the base station to the vehicle mounted station when engine rotation has ceased for subsequent real time processing and conveniently the vehicle mounted station updates corrected map values in a series of steps during vehicle running and uses said corrected map values for real time control.

Advantageously a life predicting diagnosis of the vehicle is carried out by the base station by using current operating condition signals received from the vehicle mounted station, said predicting diagnosis being carried out at predetermined intervals of time or distance travelled. In a feature of the invention the vehicle mounted station is arranged to detect an abnormality and to transmit data indicative thereof to said base station, said base station evaluates said abnormality and determines whether an emergency retransmission to said vehicle mounted station is necessary to provide an indicative warning by one of a display means or an aural means, and in such feature if the abnormality is not of an emergency nature the data is stored in a failure chart prior to transmitting counter measures from the base station to said vehicle mounted station.

The vehicle-mounted station may transmit an abnormal condition signal to the base station, the base station transmits a request for data to be analysed, the vehicle mounted station transmits data for analysis, the base station diagnoses a failure and if an emergency is determined by said base station then said base station immediately transmits a warning for indication by said vehicle mounted station but if said base station determines there to be no emergency then said base station stores data indicative of the abnormality and subsequently transmits counter measures to said vehicle mounted station whereupon said vehicle mounted station takes appropriate action in dependence thereof.

According to another aspect of this invention there is provided a system for load sharing processing operations between a vehicle mounted station and a stationary base station, said vehicle mounted station including detecting means for detecting operating conditions of the vehicle, first transmitting means for transmitting data representative of the detected operating conditions to the base station, first receiving means for receiving data from the base station, and control means for controlling vehicle operating conditions, said control means being connected to said first receiving means, and said base station comprising second receiver means for receiving data from the vehicle mounted station, processing means and storage means for processing the data received from the vehicle mounted station based upon information held in said storage means, and second transmitting means for transmitting the processed data to the first receiving means whereupon the control means is arranged to perform at least one of revise or display the vehicle operating conditions in dependence upon the processed data.

Advantageously the detecting means isadapted to detect at least one of water temperature, air/fuel ratio, air flow quantity, battery voltage, throttle valve opening angle, engine speed, transmission gear position and suspension setting. Preferably the control means is arranged to control at least one of a fuel injector, a transmission gear change means, and a suspension setting actuator.

Conveniently the first transmitting means is adapted to transmit data comprising a header, a vehicle identification, data control bits, a data array, a check symbol and an end of transmission indicator.

In a feature of this invention a vehicle-mounted station includes detecting means for detecting operating conditions of a vehicle, transmitting/receiving means for transmitting data representative of the detected operating conditions to a base station capable of evaluating said data, said transmitting/receiving means being adapted to receive evaluated signals from the base station and to apply signals representative of said evaluated signals to a control means adapted to perform at least one of vary or display said operating conditions in dependence upon said received evaluated signals.

In another feature of this invention there is provided a stationary base station adapted to receive data from a vehicle mounted station, said base station including processing means and storage means for processing the data received from the vehicle mounted station based upon information held in said storage means, the base station being adapted to perform at least one of updating/correcting maps carried by a vehicle located processor indicative of ageing in at least one of vehicle located sensors and injectors, establish the expected life expectancy of said sensors and injectors and further including transmitting means for transmitting processed data to a vehicle.

Thus, the above mentioned object is principally realized by controlling load sharing between computers. A study of computer control for vehicles indicates that data processing is roughly divided into data requiring high-speed real-time processing and data which may be processed in a comparatively long period. For example, ignition timing control and fuel injection control are control subjects that require processing in synchronism with engine rotation so that high-speed processing is required in response to high speed engine rotation. On the other hand, modification of initial settings because of ageing changes such as those in an engine transmission and suspension, may be computed over a relatively long time cycle. Also, controls which have to be computed with a high accuracy take time when processed by a vehicle-mounted computer and only increase the load on the computer.

Also, with regard to failure diagnosis or failure prediction processing when status data is obtained, arithmetic processing itself may be separated from the real-time processing without difficulty. Of course, there may be some diagnoses which require emergency processing and a feature of this invention is to discriminate and act upon abnormal conditions that require urgent actions and diagnoses.

In consideration of the increasing complexity of the control system and the necessity for higher speed processing accompanied by the increasing r.p.m. of modern engines, this invention carries out load sharing between a vehicle-mounted computer and a stationary host computer.

More specifically a feature of this invention resides in predetermining the processing sharing conditions when specific operating conditions of the engine or specific conditions of the vehicle-mounted computer are detected, transmitting information to and from the host computer and sharing the processing.

The load sharing between the vehicle-mounted computer and the stationary host computer is achieved through the following operations. When the operating conditions for the engine are detected, the subsequent processing thereon is shifted to the host computer to be shared thereby. Thus, increases in load on the vehicle-mounted computer are prevented.

The above operating conditions are detected, for example, at predetermined distance of travel, when cumulative driving time reaches a predetermined time and/or when a predetermined condition is met such as engine stopped or fuel tank low.

BRIEF DESCRIPTION OF THE DRAWINGS

The invention will now be described by way of example with reference to the accompanying drawings in which.

In the Figures like reference numerals denote like parts.

DESCRIPTION OF PREFERRED EMBODIMENTS

Figure 1:
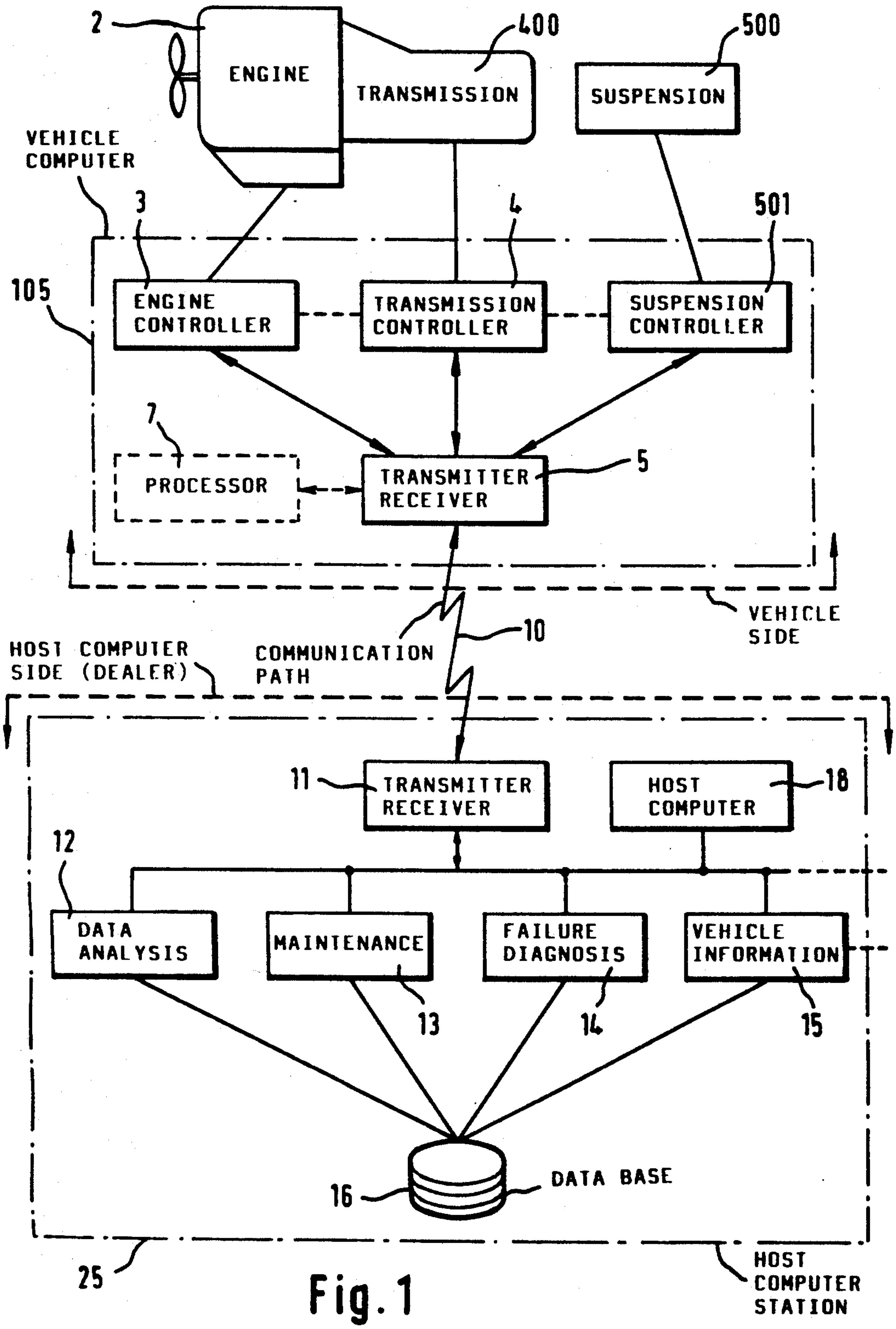
FIG. 1 is an overall block diagram of a system according to the present invention.

In the drawings, FIG. 1 shows one embodiment of the overall system where information is transmitted between a vehicle and a host computer located, for example, at a stationary, ground based dealership location through a telecommunications network.

An engine 2 in the vehicle is connected with a vehicle mounted computer 105 including an engine controller 3, a transmission 400 controller 4 and suspension 500 controller 501. In the currently described embodiment only three controllers are shown, but usually a number of these types of controllers are mounted on the vehicle. A transmitter-receiver 5 for transmitting and/or receiving information to and from the host computer 18 is provided within processor 105.

A telecommunication path 10 which may be wired or wireless, e.g. a radio link interconnects the vehicle side located processor 105 with a stationary host computer station 25 including a transmitter-receiver 11 on the host computer station side of the path. There is provided I/O (input/output units) for data analysis 12, I/O for maintenance arithmetic processing 13, I/O for failure analysis computation 14 and I/O for vehicle information 15 over a 2-way bus to the transmitter-receiver 11 and to the host computer 18. The I/O's are also linked to a data base 16 such as a memory store. The host computer side apparatus may be installed at the vehicle dealership or at a vehicle information service center. Although in this exemplary embodiment only 4 I/O's are shown, other I/O's for many other controllers may exist. The host computer 18 may have a capacity of several mega bytes. Also, here a radio communications link connecting the vehicle side and the host side is shown; radio links are preferred as being more practical because the vehicle side is normally moving. Of course, when occasion demands, information can be transmitted or received by wire communication lines from the host computer to a beacon by the roadside for subsequent wireless transmission/reception to the vehicle-mounted computer.

Also, in some cases the engine controller 3 or the transmission controller 4 as shown in FIG. 1 has its own built-in processor and carries out respective processings or a vehicle-mounted processor 7 is provided as indicated in broken lines. Hereinafter engine controls are described wherein a processor for engine control is built in.

Figure 2:
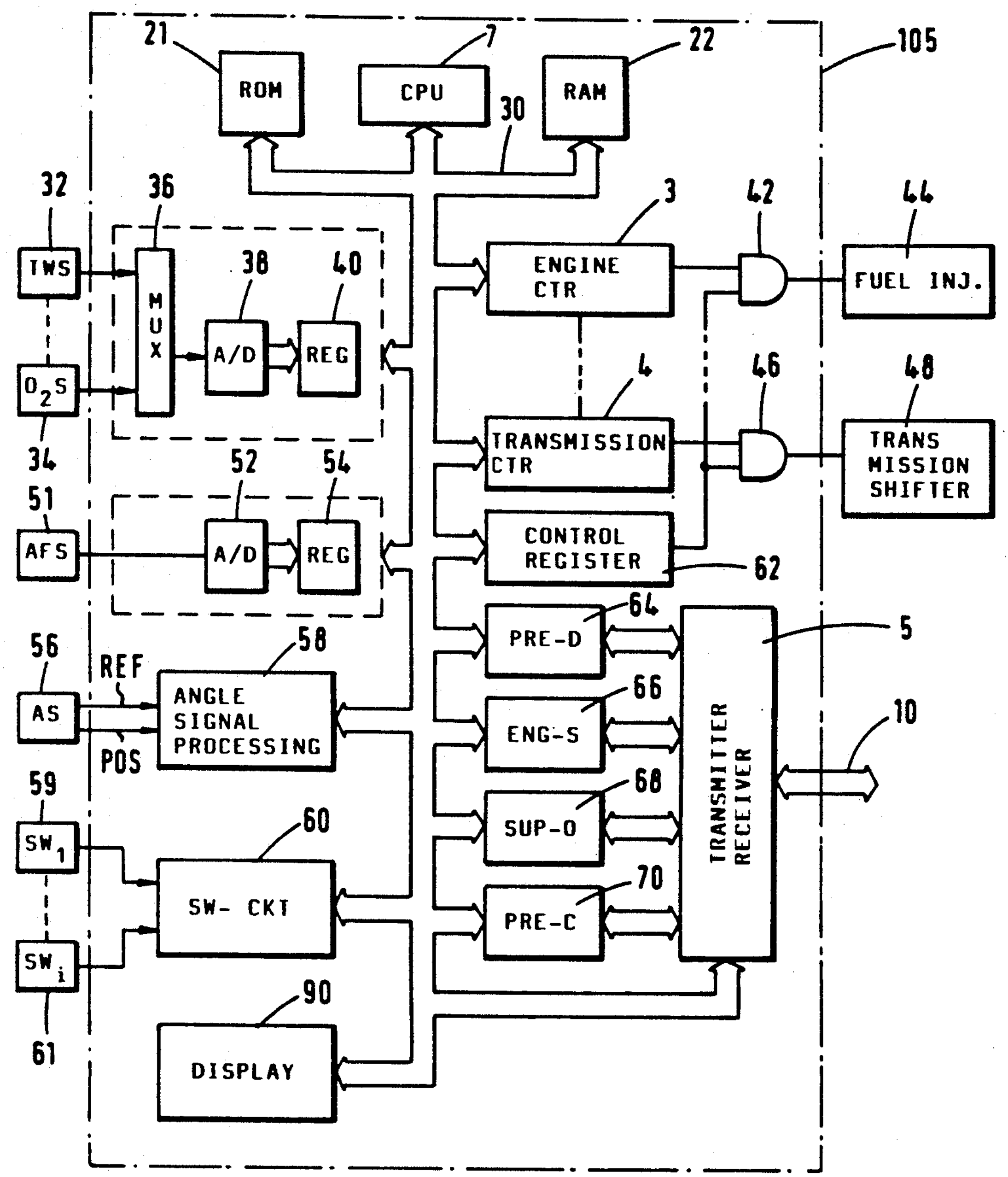
FIG. 2 is a block diagram of the vehicle-mounted computer.

FIG. 2 shows the computer 105 on the vehicle side with the suspension controller 501 omitted. ROM 21, RAM 22 and CPU 7 are connected by a bus line 30 for I/O processing. The bus line consists of a data bus, a control bus, and an address bus.

Other sensors (of which only two are shown) sense the engine operating conditions, inter alia, the engine cooling water temperature (TWS) 32 and the air/fuel ratio ($O_2S$) 34. Battery voltage and throttle valve opening and rotation speed also correspond to operating condition signals, but here they are omitted. A multiplexer 36 inputs the operating condition signals into an A/D conversion circuit 38. A register 40 sets A/D converted values.

An inlet pipe air flow sensor (AFS) 51 has its value set in a register 54 after conversion in an A/D converter 52. An engine angle sensor (AS) 56 provides reference signals REF and angle position signals POS to an angle signal processing circuit 58. The processed signals are used to control synchronizing signals and timing signals.

Engine operating condition ON/OFF switches (SWI–SWi) 59–61 indicate parameters such as start engine and engine idle. These signals are input into an ON-OFF switch-condition signal-processing circuit 60 and are used independently or in combination with other signals forming logic signals to determine controls or controlling methods known per se.

The CPU 7 carries out computations based on the above mentioned operating condition signals in accordance with multiple programs stored in ROM 21 and outputs its computation results into respective control circuits through the bus lines 30. Here the engine control circuit 3 and the transmission control circuit 4 have been shown, but numerous other control circuits such as an idle speed control circuit and exhaust gas recirculation (EGR) control circuit are possible.

The engine control circuit 3 has a fuel controller for controlling air/fuel ratios and increases or decreases the amount of fuel supplied by controlling an injector 44. 42 is a logic circuit for these controls. The transmission controller 4 carries out a transmission shift 48 in the transmission 400 through a logic circuit 46 based on the computation results of the driving conditions. A control mode register 62 presents timing signals for various control outputs.

Timing circuits 64–70 control transmitting and receiving operations. For example, circuit 64 outputs a trigger signal into the transmitter-receiver whenever a predetermined distance is travelled and transmits a corresponding engine operation condition signal through the transmitter-receiver to the stationary host computer. A display 90 is used to display instructions to the driver.

Figure 3:
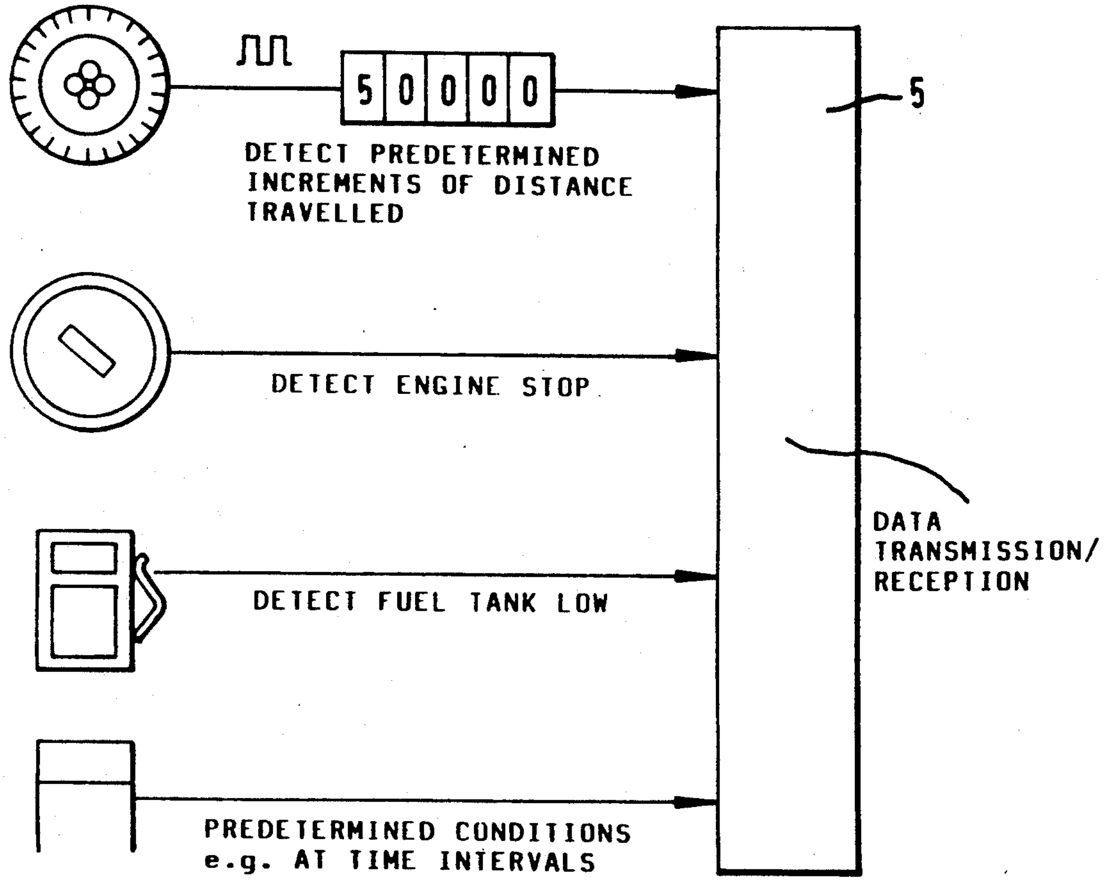
FIG. 3 shows occasions when transmission/reception between the computers is performed, FIGS. 4(A) and (B) respectively show a data signal and a data transmission/reception sequence.

Circuit 66 is used to detect an engine stopped and to trigger an output signal thereupon. Circuit 68 is used to detect a low fuel tank condition and trigger an output signal thereupon. Circuit 70 is used to check whether predetermined conditions are met and when satisfactory, generate a trigger output signal. FIG. 3 shows symbol illustrations of these circuits.

To sum up, circuits 66 to 70 produce signals which decide timing to transmit operating condition data to the stationary host computer. For example, from the circuit 64 which generates a signal whenever a predetermined distance has been travelled, it is possible to diagnose the operating condition per the predetermined travel distance. When only condition signals are transmitted, the host side computer makes a diagnosis based on deviations from the previous values or past condition signal data and conveys instructions based on its results to the vehicle-mounted computer. The vehicle-mounted computer gives driver instructions through a display or alarm in dependence upon the severity or grade of those instructions or modifies processing programs or sets parameter values.

Figure 4A:
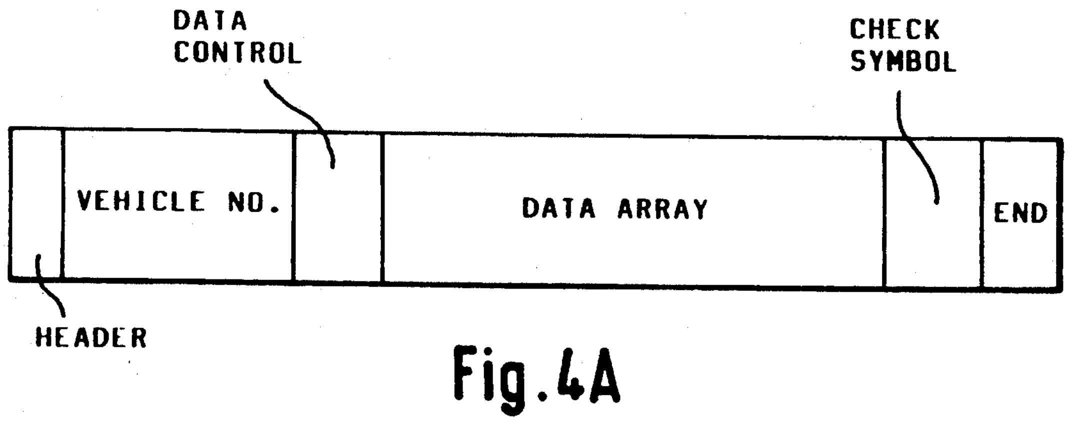
Figure 4B:
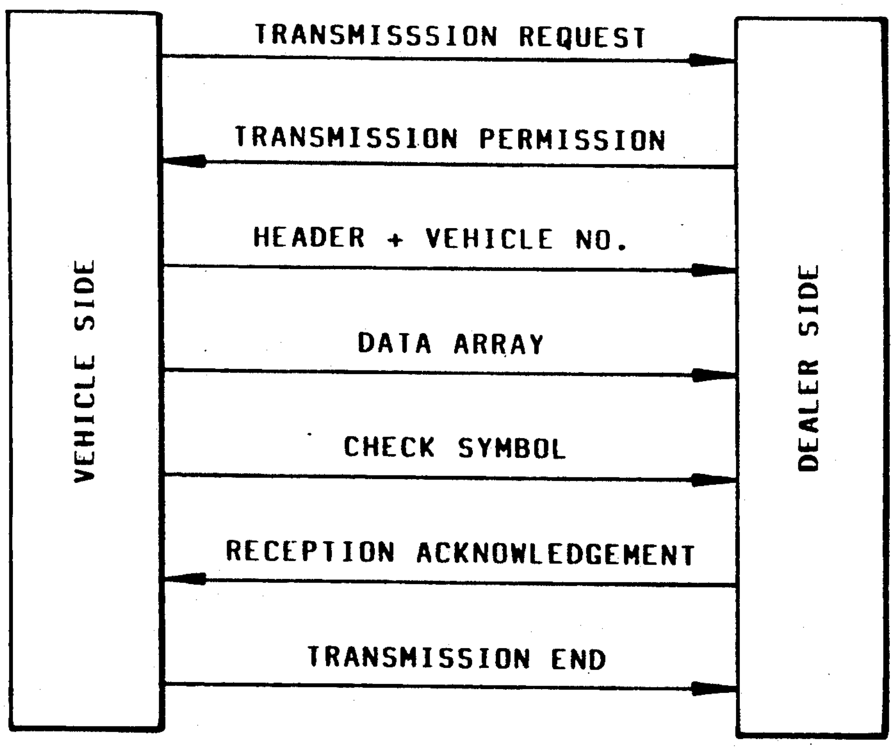

FIG. 4(A) shows an example of a data array and FIG. 4(B) shows a data transmitting and receiving sequence during data communications between the vehicle-mounted computer and the stationary, e.g. ground, host computer (here a dealer located computer). A subject vehicle is specified by a header and a vehicle number (a number that is unique to the vehicle such as the engine number or the car body number).

Figure 5:
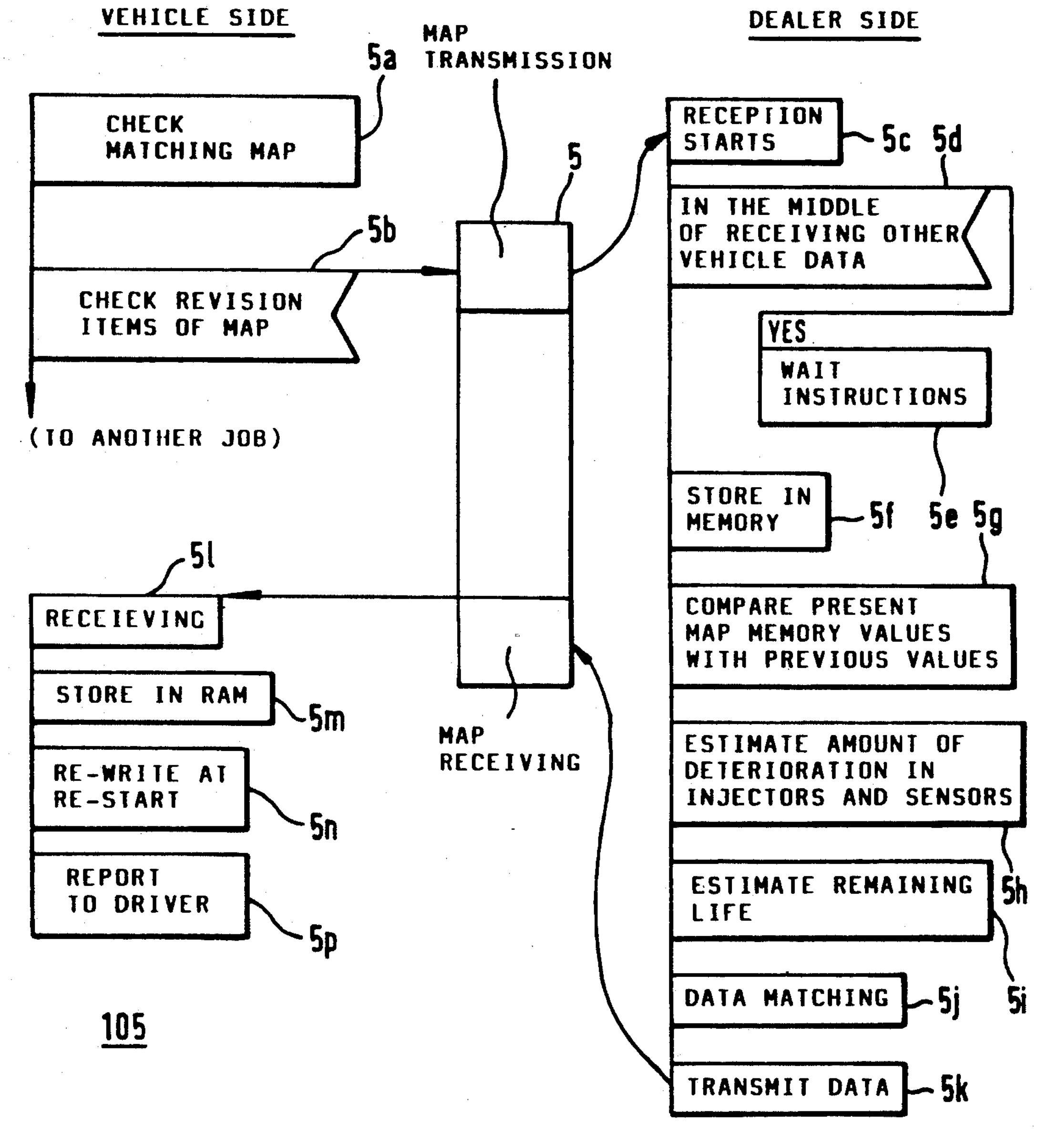
FIG. 5 is a diagram of checking revised items for map matching.

FIG. 5 shows a processing example when correction items in the map matching are checked (data analysis), the transmitter-receiver 11 at the dealer side being omitted for clarity. When controlling an engine via a microcomputer, control data is computed based on output conditions of each sensor. In addition, a system is used for subsequent engine control by responding to various engine conditions and by storing control data computed as a learning map. FIG. 5 shows an example of using other control data values after corrections by analysing such control data stored in the so-called learning map or data to be changed together with other engine controls.

The program processing on the vehicle side is assumed in this example to be to check a map (step 5*a*). This satisfies conditions by the circuits 64 to 70 as described previously and the checking program of the map starts. Although this is simply called map matching, there is a learning map for ignition timing based on the output of a knock sensor or a learning map for defining an injection pulse width of the fuel injector based on the fuel/air ($O_2$ feedback) from an exhaust to an inlet fuel injector, i.e. an $O_2$ detector detects if exhaust gas mixture is lean or rich and sends a pulse in dependence thereon to the fuel injector. Map revision is described later in detail with reference to FIG. 8. Now, the flow of the transmission processing at the time of map matching is generally explained.

In step 5*a*, the vehicle-mounted computer checks data in the map by using various methods. For example, when data values contained in the learning map for defining the injection pulse width of the injector using parameters of number of revolutions of the engine N and engine load Qa/N (where Qa is quantity of air) during $O_2$ feedback are analysed, the corresponding map of the output of the inlet pipe air flow sensor and the air flow quantity is revised by comparing actual data values with previous data values and if the comparison result exceeds a predetermined value then the actual value is used to reset the map, thus effecting a "learning" process. The injector factor is also revised when the injection pulse width of the injector is determined in relation to the engine load Qa/N. Based on checking of the map, engine control data revisions are determined. In step 5*b*, the vehicle-mounted computer selects necessary data values in the map under check to be used to newly correct engine control data or computes data to be transmitted to the host computer by processing data values stored in the map and stores them in RAM as a map. When data to be transmitted is determined such is rendered as a trigger signal, the map arithmetically processed in the vehicle-mounted computer and contained in RAM is transmitted through the transmitter-receiver 5. The dealer side (host computer), having received this, executes its program based on received signals. In step 5*c*, data signal reception from the vehicle-mounted computer is started. However, in step 5*d*, if the dealer-side is already receiving data from another vehicle, a wait instruction is issued in step 5*e*. When not receiving data from another vehicle, the received data is stored in the memory of the host computer in step 5*f*. In step 5*g*, present memory values are compared with past values previously transmitted to the host computer. In step 5*h*, the amount of deterioration in actuators, such as injectors, and sensors such as inlet air quantity (Qa) sensors, is estimated based on the compared results. Next, in step 5*i*, the remaining life is estimated from the deterioration amount. In step 5*j*, data transmitted from the vehicle-mounted computer is computed in accordance with a predetermined program to determine data to be corrected at the vehicle computer. In step 5*k*, this data is transmitted through the transmitter-receivers 11 and 5. When it receives a transmission signal from the host computer, the vehicle-mounted computer starts the arithmetic processing. When in step 51 receiving the corrected map transmitted from the host computer commences, it is stored in RAM in step 5*m*. In step 5*n*, the corrected map is re-written when the engine restarts after stoppage. In step 5*p*, notification is made to the driver visually, through the display or audibly that the map has been re-written. This is an example of notifying the driver for caution's sake, because correction items of the map may influence driving characteristics of the vehicle and even whether the vehicle should be driven. However, for cases that do not specifically require this, notification can be omitted. Also, in step 5*p*, it is possible to display the deterioration amount and remaining life of the injector or sensor. Alternatively, re-writing the map at the time of re-starting the engine for example and/or shifting to the corrected map during travel can be made. However, at this time a method to enable a smooth transition is preferred. For example, methods as follows may be carried out, in that, when the deviation before correction is smaller than a predetermined value, a sequential transition is made and when the deviation is larger than the predetermined value, its intermediate value (in some cases, plural intermediate values) is established and shifted step by step to a corrected map. In addition, re-writing the map may also be carried out in a predetermined period after the power key switch is turned off, i.e. power is supplied for a predetermined period after the power key switch is turned off to enable the map to be re-written or memorised.

Figure 6:
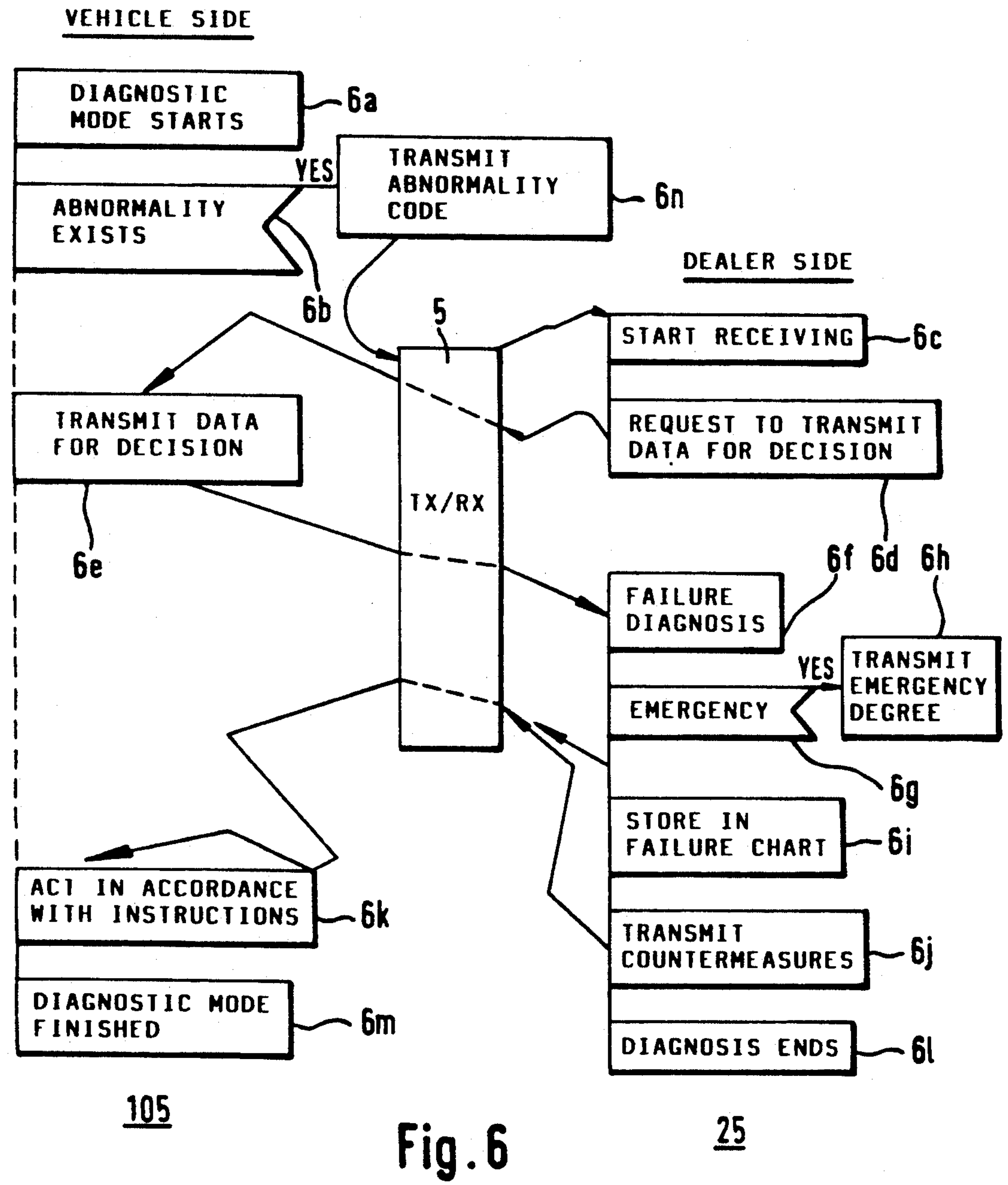
FIG. 6 is a diagram of failure diagnosis.

FIG. 6 shows an example of a failure diagnosis, the transmitter-receiver 11 again being omitted for clarity. The vehicle-mounted computer carries out time-sharing computations of the injection pulse width for the injector and ignition timing in real time. For this, computations for a failure diagnosis are made in the intervals of these computations and only a basic diagnosis are made. This embodiment is based on the concept of having the vehicle-mounted computer make a basic abnormal diagnosis and transmit the data to the host computer. The host computer then makes more advanced, comprehensive and appropriate diagnosis using data indicative of the condition of other control subjects.

In step 6a, the diagnostic mode starts. This is carried out in parallel with the general program and for example, is repetitive at predetermined intervals of about 60 ms. In step 6b, a decision on whether any abnormality exists is made based on the diagnosis results. When no abnormality exists, the process ends. When an abnormality exists, the abnormal code is transmitted to the host computer on the dealer side through the transmitter-receivers 5 and 11. The host computer is triggered by the transmitted signal and executes a more detailed failure diagnosis program. Having received the abnormal code in step 6c, in step 6d, the host computer selects comprehensive control data necessary for failure diagnosis based on the abnormal code and asks the vehicle-mounted computer to transmit data for decision. Upon receipt of the request for transmission, the vehicle-mounted computer transmits the data for decision in step 6e. In step 6f, the host computer diagnoses comprehensively the failure using the data for decision transmitted from the vehicle-mounted computer. In this case, because the host computer is not carrying out the real-time arithmetic processing such as computation of the injector's injection pulse width, if the results of the failure diagnosis in step 6f in which an overall diagnosis is possible based on the data transmitted from the vehicle-mounted computer indicate an emergency, the host computer immediately transmits emergency measures to the vehicle-mounted computer. If an emergency treatment is not specifically diagnosed, the host computer stores the received data in a failure chart in step 6i and subsequently transmits countermeasures to the vehicle-mounted computer in step 6j and completes the diagnostic flow in step 6l. In step 6k, the vehicle-mounted computer takes actions based on the countermeasure signals from the host computer and ends the diagnostic mode process at step 6m.

Figure 7:
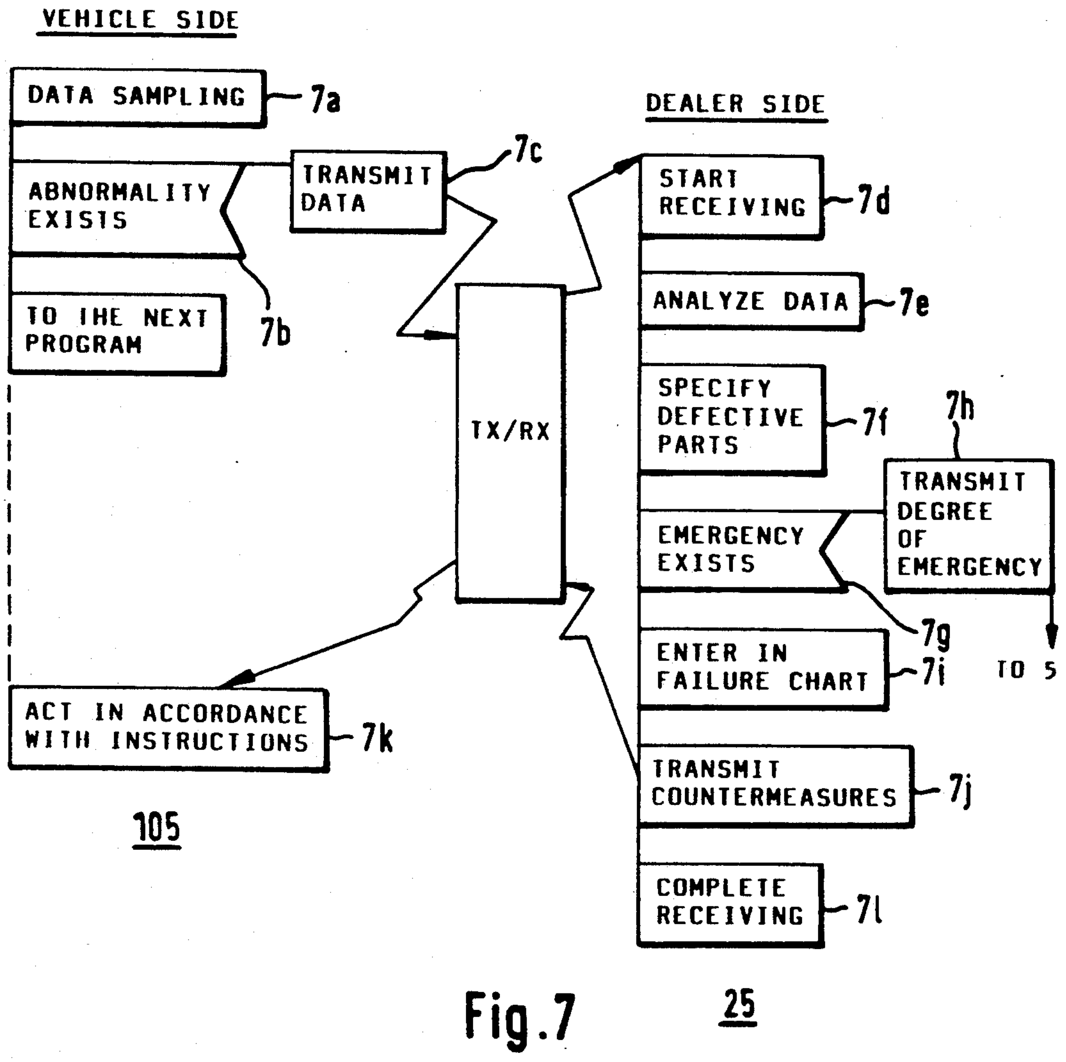
FIG. 7 is a diagram of long-term data sampling.

FIG. 7 shows an example regarding life prediction or failure prediction in accordance with data collected through sampling over a long period of time in which the transmitter/receiver 11 is again omitted for clarity. In step 7a, the vehicle-mounted computer carries out data sampling at every predetermined interval to detect abnormalities. Detection of abnormalities in this case is a very simple detection of abnormalities and a high-level failure diagnosis is carried out by the host computer. In step 7b, an existence of abnormalities is confirmed and in step 7c, the vehicle-mounted computer transmits the necessary data including sampling values to the host computer through the transmitter-receivers 5, 11 and completes the flow process. If there is no abnormality, the flow process is completed. In addition, in view of the long-term data sampling, high-level failure diagnoses by the host computer may be made at every predetermined distance of travel as shown in FIG. 3 or by the circuit 64 in FIG. 2. Upon receipt of the data transmission signal from the vehicle-mounted computer, the host computer starts the failure diagnosis program in step 7d. In step 7e, control data accumulated in the memory of the host computer is analyzed to predict life expectancy. In step 7f, defective parts are specified from data analysis results. In step 7g, the degree of emergency is determined. If there is an emergency, the host computer transmits a signal to that effect to the vehicle-mounted computer through the transmitter-receivers 11, 5 in step 7h. The host computer makes life expectancy predictions based on the analysis results and stores the predictions in the failure chart at step 7i. At step 7j, countermeasure signals are transmitted to the vehicle-mounted computer to complete the flow process in step 7l. The vehicle mounted computer, in step 7k, takes action in accordance with the signal transmitted from the host computer and completes the process.

Thus, this invention has shared processing where items are divided into those requiring processing by a vehicle-mounted processor and those requiring long-term or highly accurate computations by a stationary larger computer. Having a vehicle-mounted processor execute all processings, as has been performed in the prior art, only makes a vehicle-mounted processor larger in capacity and physical size.

With regard to checking of the matching map as well as checking of revision items in the map, as performed in steps 5a and 5b of FIG. 5, a detailed explanation will now be made by taking map revisions based on the $0_2$ feedback map as an example. Although there is a prior application (Japanese Patent Application No. 63-283886 (1988)) by the same applicant as this invention regarding $0_2$ feedback and learning based thereon, its basic methods and concepts are described as follows. The injection time of the injector is determined by the equations (1) and (2) below.

$$Ti = \alpha \cdot Tp \cdot (Ke + Kt - Ks) \cdot (1 + \Sigma Ki) + Ts \quad (1)$$

$$Tp = Kconst \cdot Qa/N \quad (2)$$

where

Kconst: injector factor

Tp: basic injection time $\alpha$: correction factor for air/fuel ratio

Ts: delayed injection time of injector due to mechanical and electrical propogation lag Ke: steady-state learning factor Kt: transient learning factor Ki: a correction factor Ks: shift factor Qa: sucked air flow amount N: number of engine revolutions That is, a basic fuel injection time Tp is determined through a sucked air flow amount of Qa of the engine and the rotational speed N from equation (2) and the correction factor $\alpha$ is changed and corrected so that a stoichiometric air/fuel ratio is obtained based on the output of the air/fuel ($0_2$) sensor. Here, the correction factor $\alpha$ largely deviates from 1.0 because of "ageing" changes in actuators such as the injectors and of sensors. Therefore, supplementary corrections are performed by means of the steady-state learning factor Ke and the transient learning factor Kt to make the correction factor $\alpha$ be nearer to 1.0 and determine the fuel injection time Ti.

Figure 8:
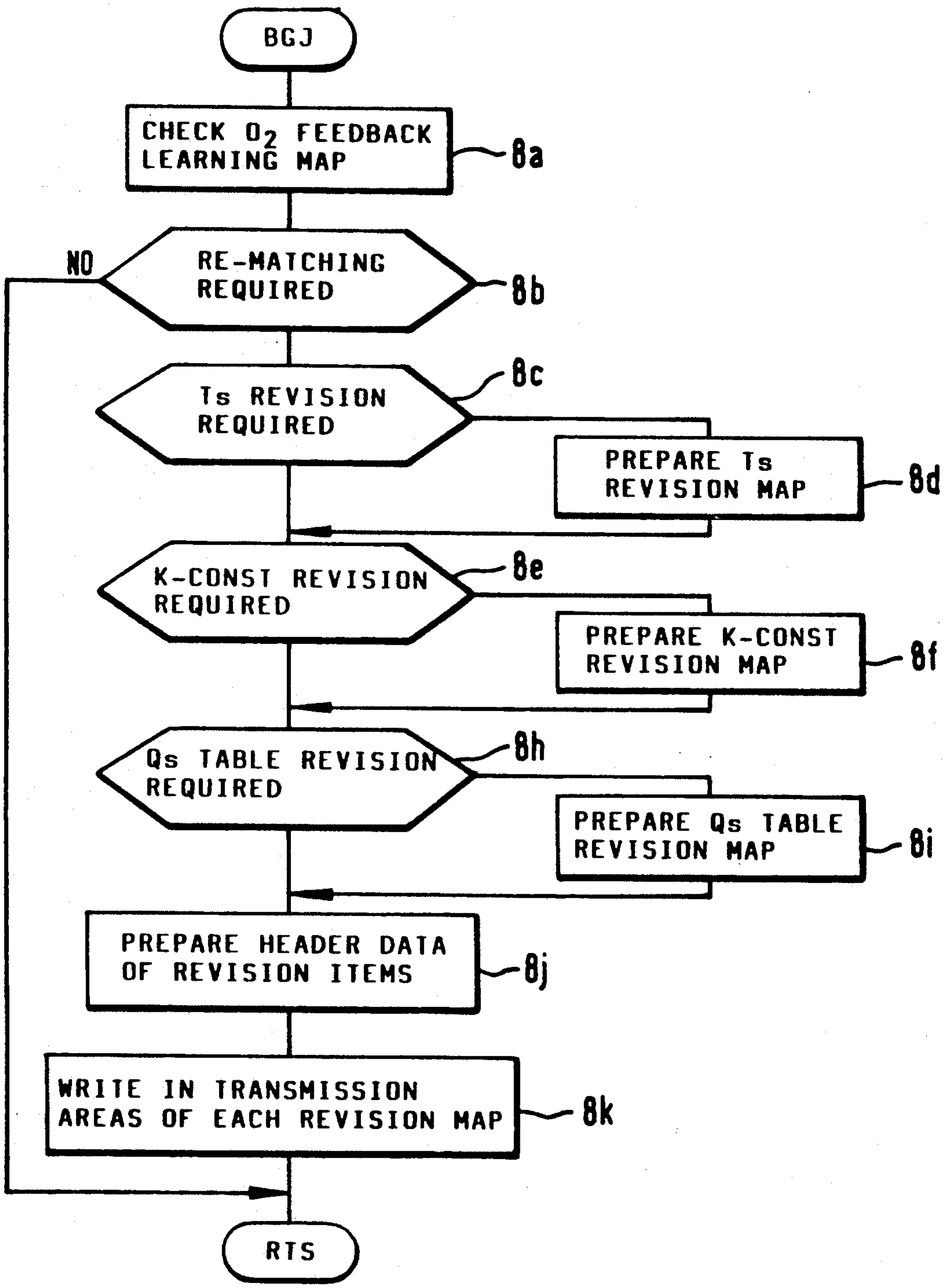
FIG. 8 is a flow chart for preparing a revised map.

FIG. 8 shows a flow chart for preparing correction maps. In step 8a, the $0_2$ feedback learning map is checked to decide whether there are maps requiring corrections. Based on the check results, a decision is made in step 8b whether there are maps requiring rematching. If not, the process ends. In this embodiment, a Ts map, a Kconst map and a Qs table are illustrated as maps requiring re-matching. Maps requiring re-matching are specified in steps 8*c*, 8*e* and 8*h* and in each of steps 8*d*, 8*f* and 8*i*, control data to be transmitted to the host computer is selected or computed if necessary and is stored in the RAM address of the vehicle-mounted computer to prepare the maps. In step 8*j*, header data of revision items corresponding to the map to be corrected is prepared, the corrected map is read out from RAM to write in the transmission area in preparation for transmission to the host computer in step 8*k* and the flow is completed.

Criteria to decide whether a revision is required and specific revision procedures are made in accordance with, for example, prior Japanese Patent Application No. 63-181794 (1988) of the present applicants.

Figure 9:
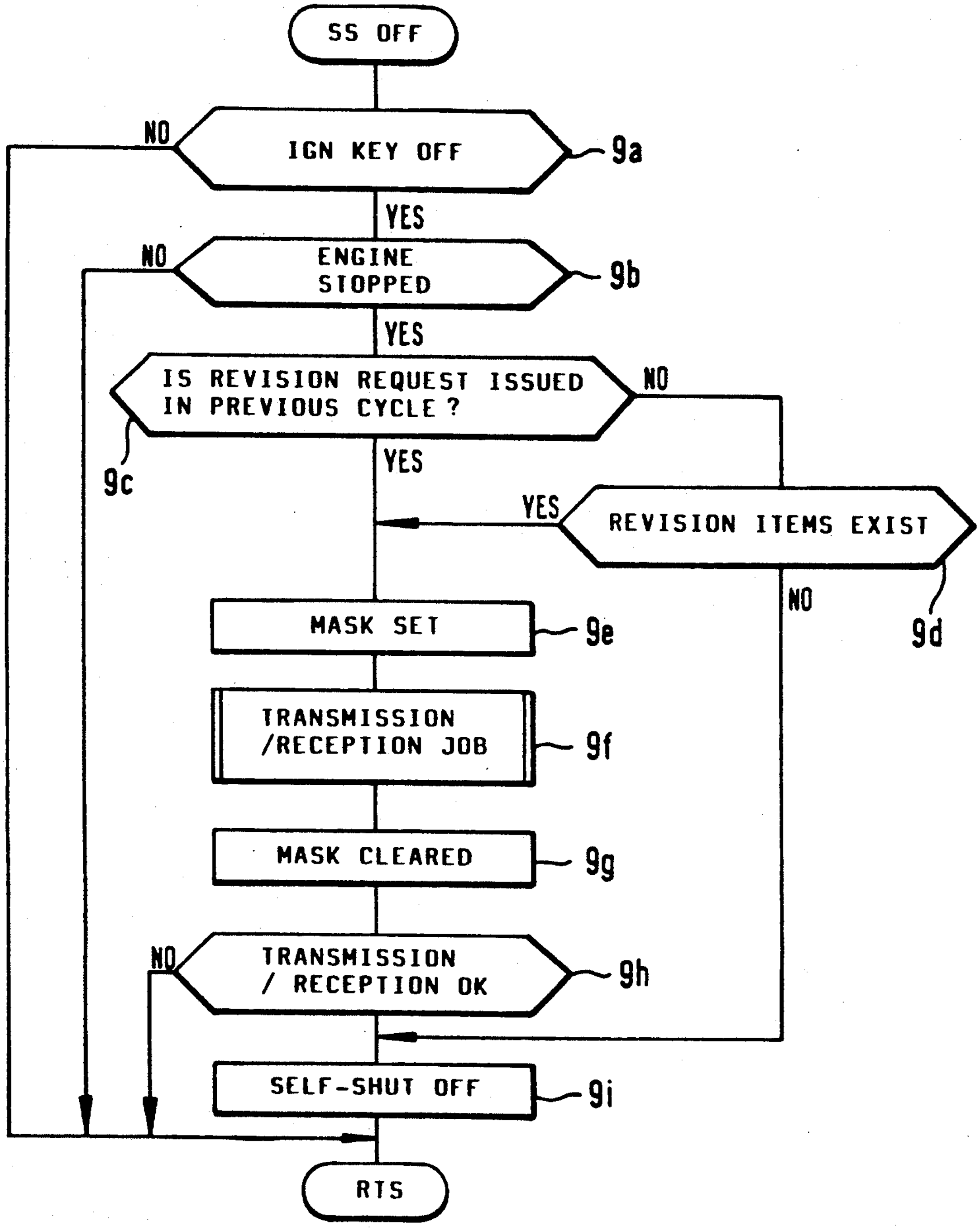
FIG. 9 is a data transmission flow chart when the engine is stopped.

FIG. 9 shows an example of data transmission and reception when an engine stops. The engine is controlled by a microcomputer by computing control values to control actuators such as the injector based on outputs of each sensor, including the inlet air flow and crank angle sensors. Each datum may be required for failure diagnosis and matching by the host computer. Necessary data is taken in and stored in the host computer at every ignition key turn OFF.

In step 9*a*, a decision is made whether the ignition key is turned ON or OFF. When turned ON, the engine is running and the flow terminates. In step 9*b*, a decision is made whether the engine is rotating or not. When rotating, the flow ends. In steps 9*c* and 9*d*, a decision is made whether data transmission to the host computer is required or not. In other words, when the previous revision request is issued in step 9*c* and when there are revision items of the map to be corrected in step 9*d*, a decision is made that data transmission is required and operation proceeds to step 9*e*. Otherwise, operation proceeds to step 9*i*. In step 9*e*, a mask setting for transmission/reception is made to prevent interruption, the transmission/reception program is executed in step 9*f* and the mask is cleared in step 9*h*. In step 9*h*, transmission/reception is carried out through the transmitter-receiver 5 if transmission/reception is possible. If transmission/reception is not possible, the flow ends. When transmission/reception is made, the flow proceeds to step 9*i*, self-shut off and automatically stops the computer after the elapse of a predetermined time.

Next, the execution of data matching in step 5*j* of FIG. 5 by the host computer will be explained by taking FIG. 10 as an example.

Figure 10:
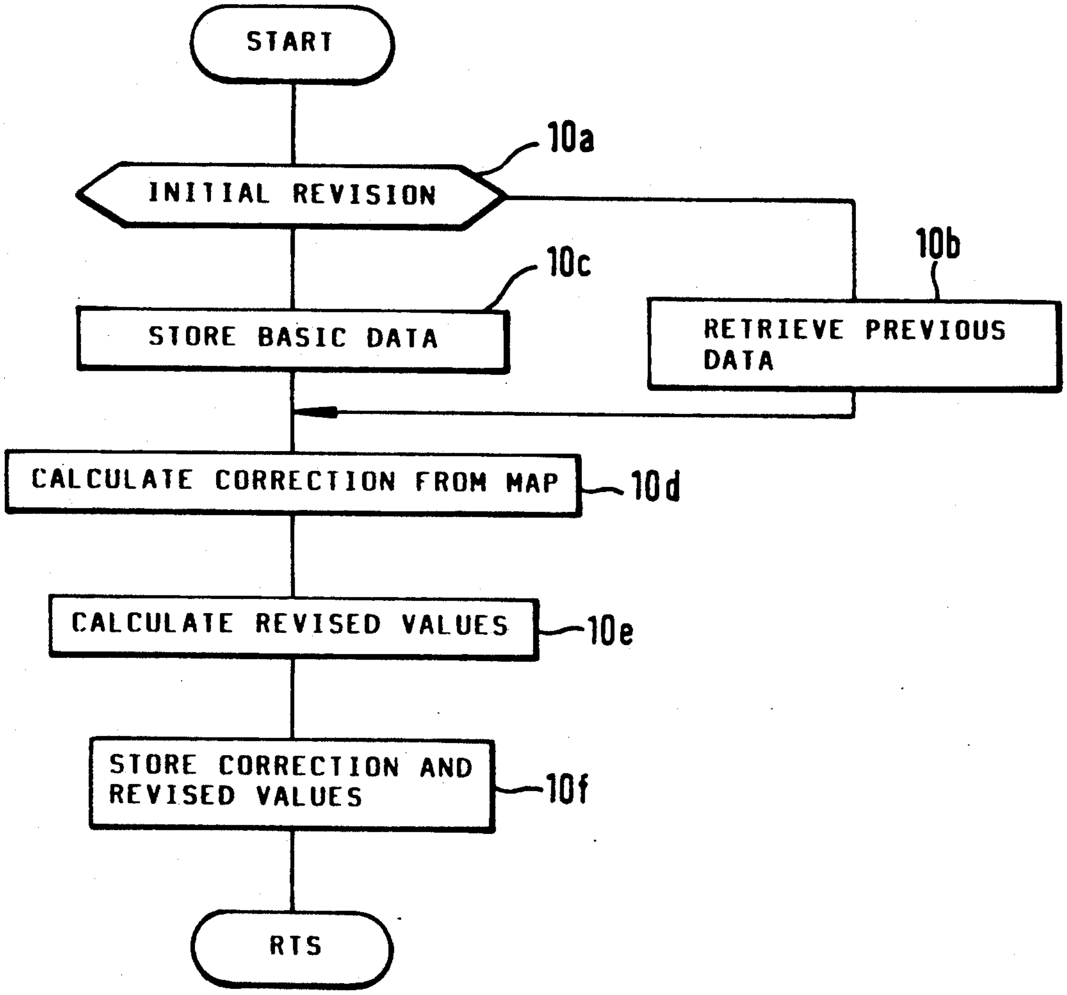
FIG. 10 is a flow chart for revised values.

FIG. 10 is an example of obtaining deviations from the previous revision data and for evaluating correction values. In step 10*a*, a decision is made whether the revision is the first or not. If it is the first revision, basic data is stored in step 10*c*. If not, the previous data is retrieved. In step 10*d*, a correction value is calculated from the map data transmitted from the vehicle-mounted computer, revised (corrected) values in each map are calculated in step 10*e*, the calculated values are stored in the memory in step 10*f* and the process completes.

Figure 11:
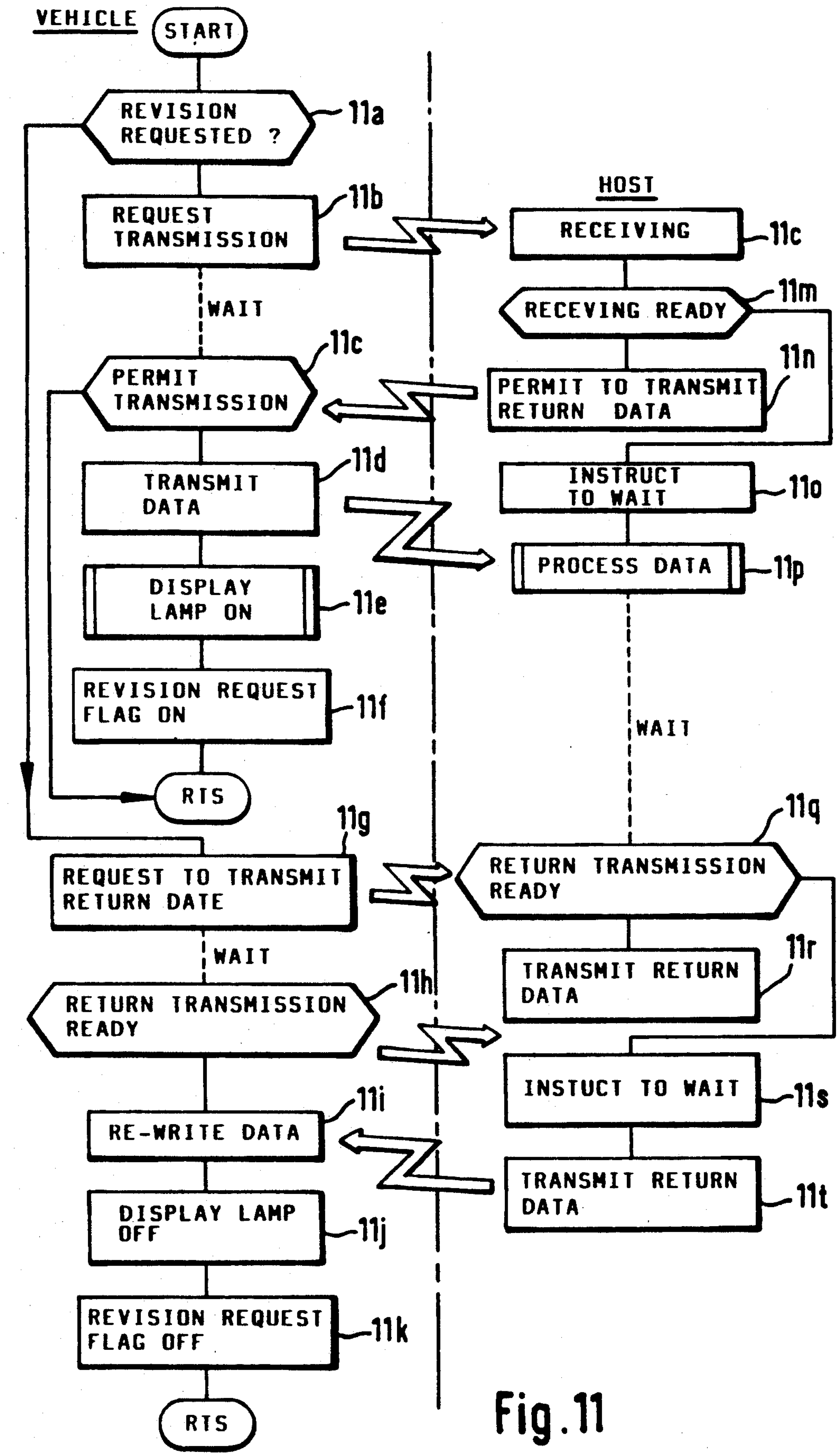
FIG. 11 is a series flow chart of transmissions and receptions.

FIG. 11 is an exemplary flow diagram of data transmission/reception. The vehicle-mounted computer starts a flow process at every predetermined interval. In step 11*a*, a decision is made whether the revision request has been completed or not. When completed, the flow proceeds to 11*g* and moves to the data return transmission program. If there is a transmission request in step 11*b*, necessary data is transmitted to the host computer. Next, the vehicle-mounted computer awaits until the host computer transmits a signal permitting transmission. In step 11*l*, the host computer receives the transmission signal from the vehicle-mounted computer and at step 11*m* determines if it is ready to receive the transmission from the vehicle-mounted computer. If it is ready a signal permitting transmission is derived in step 11*n* and if it is not ready then a wait instruction is issued in step 11*o*. The vehicle-mounted computer transmits data in step 11*d* if it has received a transmission permit in step 11*c*, lights up the display lamp in step 11*e* and applies a revision request flag ON in step 11*f*. If there is no transmission permit, the flow process ends. The host computer, which has received data, processes the data in step 11*p* and then, if the vehicle-mounted computer requires data return transmission in step 11*g*, decides whether return transmission is possible or not in step 11*q*. If return transmission is possible, it transmits back the processed data in step 11*r*. If it is not possible to transmit data back, the host computer issues a wait instruction in step 11*s* and transmits back the data in step 11*t*. The vehicle-mounted computer releases the wait condition and receives the processed data in step 11*h* when a signal permitting data return transmission is transmitted, re-writes the data in step 11*i* based on the data transmission from the host computer in step 11*t*, turns OFF the display lamp in step 11*j*, puts OFF the revision request flag in step 11*k* and completes the process.

Having now fully described the present invention it will be realised that processing by a vehicle-mounted computer can be transferred to a stationary host computer as the occasion demands and real-time vehicle controls are implemented effectively without increasing the workload of the vehicle-mounted computer.

It is to be understood that various modifications may be made and that all such modifications falling within the spirit and scope of the appended claims are intended to be included in the present invention.

We claim:

1. A method of load sharing processing operations between a vehicle mounted station and a base station including the steps of said vehicle mounted station detecting operating conditions of the vehicle, transmitting data representative of the detected operating conditions to the base station which do not require real-time processing and are determined to be processed at the base station, said base station receiving said data from the vehicle mounted station, processing said data in accordance with data stored by said base station, said base station transmitting processed data to a receiver at said vehicle mounted station, and control means at said vehicle mounted station connected to the vehicle mounted receiver and performing at least one of revising and displaying the vehicle operating conditions in dependence upon the processed data received.

2. A method as claimed in claim 1 wherein the vehicle mounted station detected operating conditions are performed by a detecting means which detects at least one of water temperature, air/fuel ratio, air flow quantity, battery voltage, throttle valve opening angle, engine speed (N), transmission gear position and suspension setting.

3. A method as claimed in claim 1 wherein the vehicle mounted station includes a control means which controls at least one of a fuel injector, a transmission gear change means, and a suspension setting actuator.

4. A method as claimed in claim 1 wherein the data transmitted from the vehicle mounted station to the base station is performed at times of occurrence of predetermined conditions including at least one of the vehicle covering a predetermined distance, detection of the engine ceasing rotation and low fuel tank condition.

5. A method as claimed in claim 1 wherein data transmitted between the vehicle mounted station and the base station includes header bits, vehicle identification bits, data control bits, data array bits, check symbol bits and end of transmission bits.

6. A method as claimed in claim 1 wherein the vehicle mounted station transmits a request to transmit to the base station, said base station transmits a permission to transmit for the vehicle mounted station, said vehicle mounted station transmits data including header bits, vehicle identification bits, data control bits, data array bits and check symbol bits, said base station transmits a receipt acknowledgement and said base station transmits end of transmission bits.

7. A method as claimed in claim 1 wherein the vehicle mounted station contains at least one map indicative of vehicle operating conditions including an indication of ageing in at least one of vehicle injectors and sensors, said map being transmitted by said vehicle mounted station to said base station, said base station comparing transmitted map values with previously transmitted map values and estimating the amount of deterioration in said injectors and sensors, said base station estimating the life expectancy of said injectors and sensors and to transmit data indicative thereof to said vehicle mounted station whereby said vehicle mounted station stores said updated information and indicates the life expectancy by visual or aural means.

8. A method as claimed in claim 7 wherein corrected map values are transmitted from the base station to the vehicle mounted station when engine rotation has ceased for subsequent real time processing.

9. A method as claimed in claim 7 wherein the vehicle mounted station updates corrected map values in a series of steps during vehicle running and uses said corrected map values for real time control.

10. A method as claimed in claim 1 wherein a life predicting diagnosis of the vehicle is carried out by the base station by using current operating condition signals received from the vehicle mounted station, said predicting diagnosis being carried out at predetermined intervals including at least one of time and distance travelled.

11. A method as claimed in claim 1 wherein the vehicle mounted station detects an abnormality and to transmit data indicative thereof to said base station, said base station evaluates said abnormality and determines whether an emergency retransmission to said vehicle mounted station is necessary to provide an indicative warning by one of a display means or an aural means.

12. A method as claimed in claim 11 wherein if the abnormality is not of an emergency nature the data is stored in a failure chart prior to transmitting counter measures from the base station to said vehicle mounted station.

13. A method as claimed in claim 1 wherein the vehicle mounted station transmits an abnormal condition signal to the base station, the base station transmits a request for data to be analysed, the vehicle mounted base station transmits data for analysis, the base station diagnoses a failure and if an emergency is determined by said base station then said base station immediately transmits a warning for indication by said vehicle mounted station but if said base station determines there to be no emergency then said base station stores data indicative of the abnormality and subsequently transmits counter measures to said vehicle mounted base station whereupon said vehicle mounted base station takes appropriate action in dependence thereof.

14. A system for load sharing processing operations between a vehicle mounted station and a base station, said vehicle mounted station including detecting means for detecting operating conditions of the vehicle, first transmitting means for transmitting data representative of the detected operating conditions to the base station which do not require real-time processing and are determined to be processed at the base station, first receiving means for receiving data from the base station, and control means for controlling vehicle operating conditions, and said base station comprising second receiver means for receiving said data from the vehicle mounted station, processing means and storage means for processing the data received from the vehicle mounted station based upon information held in said storage means.

and second transmitting means for transmitting the processed data to the first receiving means whereupon the control means conducts at least one of revision and display of the vehicle operating conditions in dependence upon the processed data received.

15. A system as claimed in claim 14 wherein the detecting means detect at least one of a temperature water, air/fuel ratio, air flow quantity, battery voltage, throttle valve opening angle, engine speed, transmission gear position and suspension setting.

16. A system as claimed in claim 14 wherein the control means control at least one of a fuel injector, a transmission gear change means, and a suspension setting actuator.

17. A system as claimed in claim 14 wherein the first transmitting means transmit data comprising a header, a vehicle identification, data control bits, a data array, a check symbol and an end of transmission indicator.

18. A vehicle mounted station including detecting means for detecting operating conditions of a vehicle, transmitting/receiving means for transmitting data representative of the detected operating conditions to a base station which do not require real-time processing and are determined to be processed at the base station for evaluation, said transmitting/receiving means receiving the evaluated signals from the base station and applying signals representative of said evaluated signals to a control means performing at least one of vary and display said operating conditions in dependence upon said received evaluated signals.

19. A stationary base station which receives data from a vehicle mounted station which do not require real-time processing and are determined to be processed at the base station, said base station including processing means and storage means for processing the data received from the vehicle mounted station based upon information held in said storage means, the base station performing at least one of updating/correcting maps carried by a vehicle located processor indicative of ageing in at least one of vehicle located sensors and injectors, establishing the expected life expectancy of said sensors and injectors and further including transmitting means for transmitting processed data to the vehicle mounted station.

20. A method of load sharing processing operations between a processor mounted on a vehicle and a host computer located in a base station comprising the steps of, detecting operating conditions of the vehicle with sensors mounted on the vehicle; said vehicle mounted processor performing data processing operations based upon the detected operating conditions of the vehicle and generating control signals for the vehicle actuators; said vehicle mounted processor shifting predetermined data processing operations, together with predetermined detected operating conditions of the vehicle to said host computer at a predetermined time which data processing operations are required for operating of the vehicle but which do not require real-time processing, and rewriting a map in accordance with the processed data from said host computer, said map being carried on said vehicle and determining operating conditions of the vehicle.

* * * * *